United States Patent [19]

Sorensen

[11] 4,227,738
[45] Oct. 14, 1980

[54] SUNROOF FORWARD EDGE LATCH

[75] Inventor: Norman L. Sorensen, Detroit, Mich.

[73] Assignee: Wisco Corporation, Ferndale, Mich.

[21] Appl. No.: 949,820

[22] Filed: Oct. 10, 1978

[51] Int. Cl.$^2$ ............................................. B60J 7/18
[52] U.S. Cl. .................................... 296/224; 49/465
[58] Field of Search ............... 296/137 B; 49/465; 292/257; 16/147

[56] References Cited

U.S. PATENT DOCUMENTS

| | | | |
|---|---|---|---|
| 2,215,022 | 9/1940 | Votypka | 296/137 |
| 3,913,971 | 10/1975 | Green | 296/137 B |
| 3,955,848 | 5/1976 | Lutz | 296/137 B |
| 3,974,753 | 8/1976 | Blomgren | 296/137 B |
| 4,005,901 | 2/1977 | Lutke | 296/137 B |
| 4,154,474 | 5/1979 | Hough et al. | 296/137 B |

FOREIGN PATENT DOCUMENTS 703868 1/1956 Fed. Rep. of Germany ....... 296/137 B

Primary Examiner—Robert R. Song
Attorney, Agent, or Firm—Basile, Weintraub & Hanlon

[57] ABSTRACT

A latch for supporting in a releasable manner the forward edge of the removable sunroof panel is disclosed. A frame extending around an opening in a vehicle roof has a resilient molding adapted to support the perimeter of a curve latch panel to close off the opening. The forward edge support comprises a pair of releasing bayonets attached in spaced relationships to the underside of the forward edge of the panel. A two part releasable fastener for the rear edge of the panel is movable from a first position locking the panel in a closed position to a vented position.

4 Claims, 8 Drawing Figures

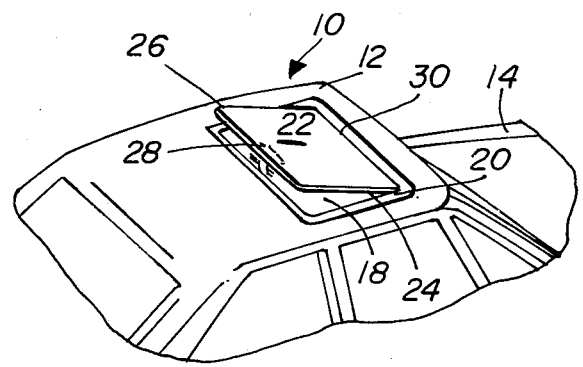
FIG-1
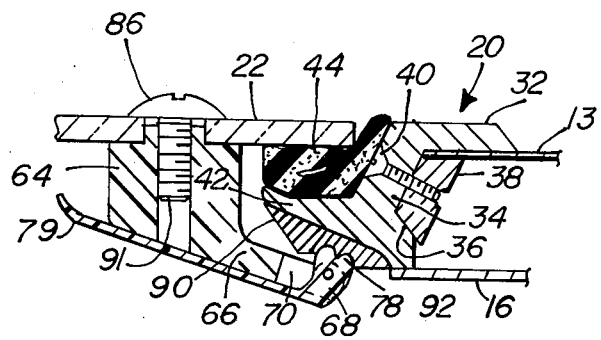
FIG-3
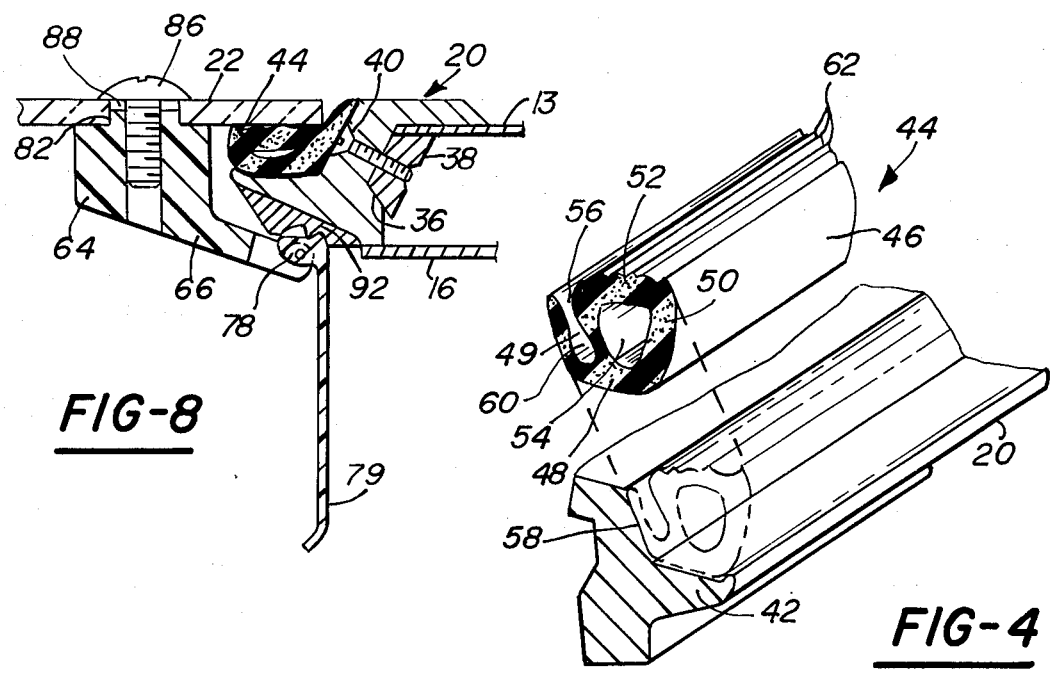
FIG-8
FIG-4

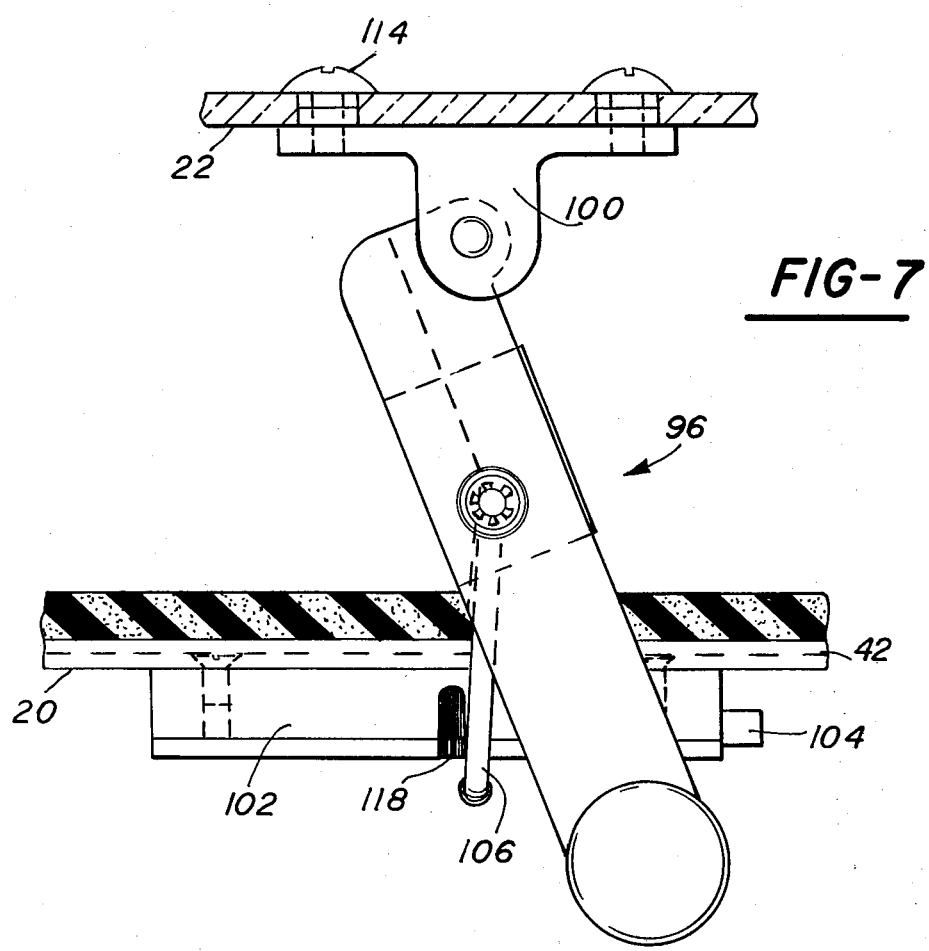
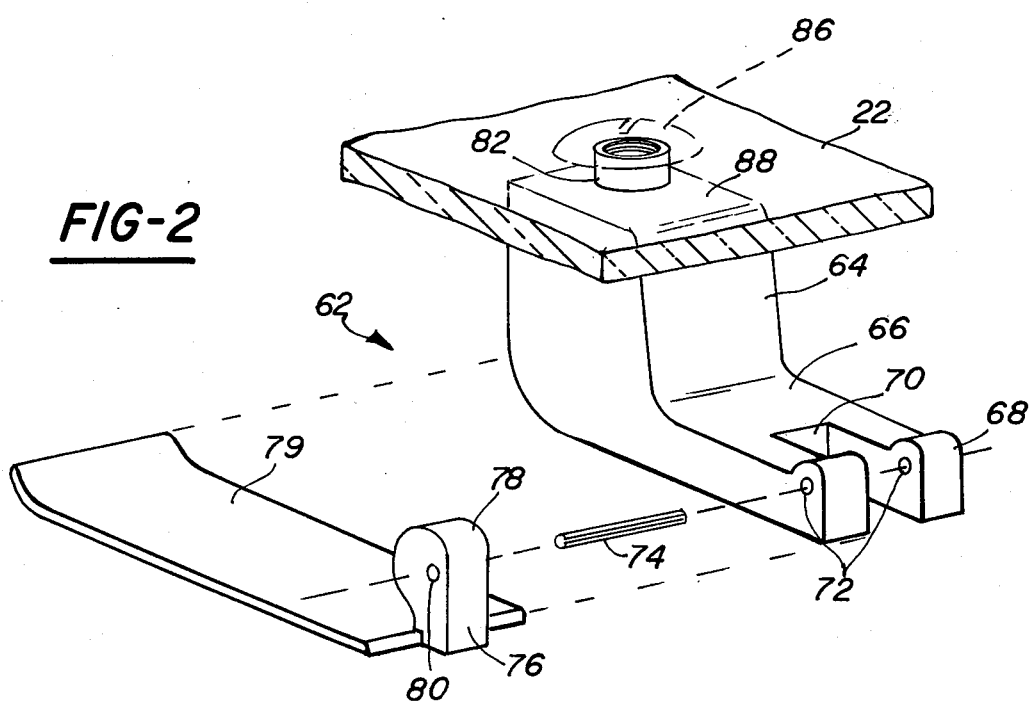

SUNROOF FORWARD EDGE LATCH

BACKGROUND OF THE INVENTION

I. Field of the Invention

This invention relates to the field of removable sunroof panels, and more particularly, to an improved releasable fastener for the forward edge of the panel to provide a simple and reliable means for attaching the forward edge of the panel to the frame and easily removing the panel from the vehicle opening.

II. Prior Art

Pending application No. 583,260 filed June 3, 1975 entitled "Detachable Sunroof Panel for Automobiles" discloses an opening in a vehicle roof adapted to receive a removable transparent sunroof panel. In this application the forward end of the panel is retained in the frame opening by a pair of bayonets. The bayonets project from the underside of the front edge of the panel to cooperate with a recessed member attached to the front end of the frame. A two-part fastener for the rear edge of the panel includes a handle pivoting about a transverse axis and pivotally connected to the underside of the panel. A tongue pivotally connected to the handle is releasably retained in a lock member in the frame. The handle acts as an overcenter linkage to squeeze the panel against the frame in its closed position. In its open position an overcenter linkage action holds the panel open with the rear edge of the panel tilted away from the frame.

Sunroof structures employing a sliding motion of the panel between a closed position and an open position to cover an opening in the vehicle include U.S. Pat. No. 2,215,022. Other examples of sunroof structures are disclosed in U.S. Pat. Nos. 3,955,848; 3,913,971; 4,005,901; 3,974,753; 4,067,605; and West German Patent-enmeldung V7038V/68B.

III. Prior Art Statement

The prior art listed hereinabove includes in the opinion of the Applicant the closest art of which the Applicant is aware.

SUMMARY OF THE INVENTION

The present invention is directed to an improved releasable means for retaining the forward edge of a sunroof panel. A pair of releasing bayonets attached to the forward edge of the sunroof panel in a spaced apart manner have disposed at their forward end a rotatable cam projection. In its first or latch position the cam projection faces in an upward direction where it is nestingly received by a recessed member attached to the underside of the frame. The upward projecting cam squeezes a resilient molding disposed around the perimeter of the opening between the frame and the forward edge of the panel. In its latched position the forward edge of the panel is rotatable or tiltable to allow the rear edge of the panel to be spaced above the frame a distance. To release the front edge of the panel so that it can be moved from the vehicle opening, the cams are rotated to be disengaged from the recess and the squeeze on the resilient molding is reduced allowing the panel to be moved rearward a distance and then removed.

The position of the rear edge of the removable panel is established by a two-part fastener which separably joins the rear end of the panel to the rear end of the frame. The two-part fastener includes a releasable latch member affixed to the underside of the frame. An arm assembly for the fastener is pivotally attached to a hinge member which is supported by the underside of the rear end of the panel. A pivoting link is pivotally attached at one end to the arm and pivotally and releasably attached at its other end to the releasable latch. The arm, the hinge and the link cooperate to form a three-element linkage which in its first position holds the rear edge of the panel closed in an overcenter position, and in its second position holds the rear edge of the panel spaced above the frame in an overcenter manner in the vented position.

When the two-part fastener is in the vent position a latch slide in the releasable latch may be moved to its released position where the pivoting link may be separated from the releasable latch to separate the rear edge of the panel from the frame. When the rear edge of the panel has been separated from the frame and the releasing bayonets placed in there released position the panel may be moved rearward a distance and removed from the opening.

It is therefore an object of the present invention to provide a new and improved releasing bayonet for the forward edge of a sunroof structure which is relatively simple in construction yet one which is of low cost and has reliable operation.

Other objects advantages and applications of the present invention will become apparent to those skilled in the art of sunroof structures when the accompanying description of one example of the best mode for practicing the invention is read in conjunction with the accompanying drawings.

BRIEF DESCRIPTION OF THE DRAWINGS

The description herein makes reference to the accompanying drawings wherein like reference numberals refer to like parts throughout the several views and wherein;

FIG. 1 is a fragmentary perspective view of a automotive vehicle incorporating a sunroof formed in accordance with the principles of the present invention with the panel shown in a tilted ventilating position;

FIG. 2 is an exploded perspective view of a releasing bayonet;

FIG. 3 is a cross sectional view through a releasing bayonet attached to the front edge of the panel;

FIG. 4 illustrates a perspective view of a portion of the resilient molding and the frame;

FIG. 7 illustrates the arm assembly in the vent position with the releasable latch assembly moved to the release position and the pivoting link released from the releasable latch separating the rear edge of the panel from the frame; and FIG. 8 is a cross sectional view as in FIG. 3 with the cam in the released position.

DESCRIPTION OF THE PREFERRED EMBODIMENT

Figure 5:
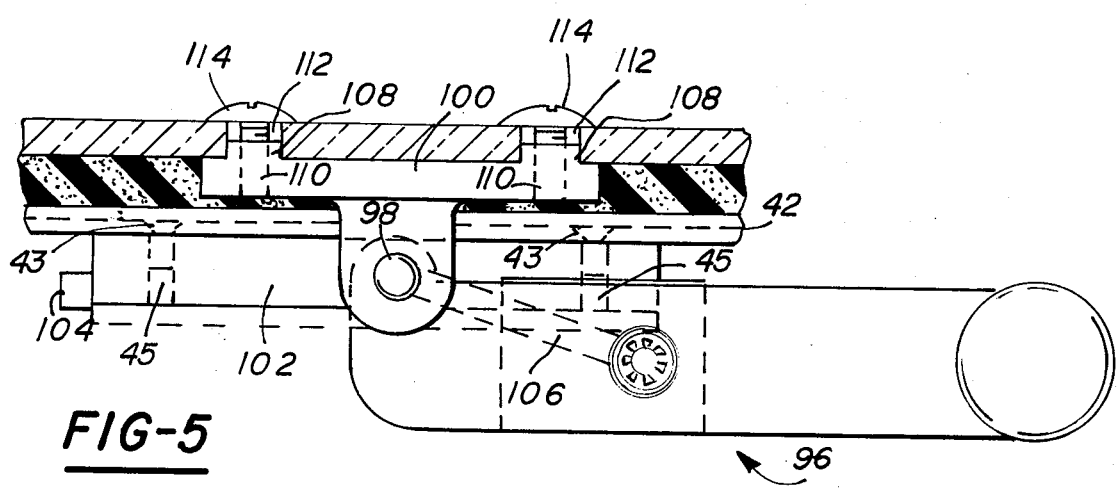
FIG. 5 illustrates a cross sectional view taken through the hinge facing the rear of the vehicle with the arm assembly in the lock position.

Referring now to the drawings, and in particular, to FIG. 1 wherein there is illustrated one example of the preferred embodiment of the present invention at 10 in the form of a sunroof 12 carried by an automobile 14. Although an automobile is illustrated, the present invention is equally adaptable to trucks, vans, recreation vehicles, and the like. And even though the removable panel is shown on the top of a vehicle it can be used equally well on the sides or other portions of the vehicle.

The roof of the automobile is typically formed from an outer sheet metal skin 13. A headliner 16 (FIG. 3) is disposed under the roof sheet 13 and spaced a distance therefrom. A sunroof opening 18 in accordance with the present invention is formed over the front seat in the roof of the vehicle and a frame member 20 is fitted around the perimeter of the opening. The frame 20 is adapted to removably secure a panel 22. The panel is preferably formed of a sheet of shatterproof, tempered, tinted glass having dimensions complimentary to the opening of the frame 20.

The panel 22 is of a general planar form modified to have a slight gradual curvature across its width so that its convex side faces outward. The side edges 24 and 26 are straight and the forward edge 30 and the rearward edge 28 curve slightly upward. The frame 20 is generally level across its width but it may have a slight crown. However, its curvature should be less than that of the panel 22 so that when the panel is first lowered into position against the frame the two side edges 24 and 26 abut the side edges of the frame 20 and the center of the front and rear edges 30 and 28 have their center slightly elevated with respect to the frame 20.

The frame 20 may be formed of extruded aluminum, bent into a closed section to conform to the roof opening 18 and having its ends joined by an appropriate fastening means such as rivets or welding. The frame 20 has a horizontally extending section 32 which overlies the top of the roof 13 at the aperture. A downwardly extending section 34 of the molding has a surface 36 inclined inwardly under the extending section 32 to form a pair of opposed tapered surfaces adapted to receive tapered wedges 38 which abut the underside of the perimeter of the roof 13 to lock the frame to the roof. The wedges 38 extend along substantial portions of the interfaces between the frame 20 and the roof 13 the wedges 38 are affixed to the frame 20 by threaded fasteners 40. The headliner 16 is attached to the underside of the section 34 by any suitable means such as an adhesive, or it is self supporting and free standing.

The frame 20 also includes a section 42 cantilevered to the opening 18 below and parallel to the plane of the roof. A resilient molding 44 is attached to the upper surface of section 42 by appropriate attaching means such as adhesive bonding. As illustrated in FIG. 4 the resilient molding 44 comprises an elongated tubular section 46 having a base portion 48 which is seated on the upper surface of the frame cantilevered section 42. The tubular section 46 has upwardly and outwardly inclined intergal side walls 49 and 50 which are joined at their upper extremities thereof to a top portion 52 to define thereinbetween an air cavity 54. The base portion 48 has an inclined integrally formed flange portion 56 which extends upwardly to approximately the same height as the tubular section 44. The outside surface of the upright flange portion 56 is seated on the inclined wall 58 of the frame 20. The abutting surfaces of the molding 44 and frame 20 are secured to one another by any suitable means, such as an adhesive. The opening surfaces of the tubular section 46 and the upright flange portion 56 are laterally spaced from each other and define a longitudinal space 60, for the purpose to be described hereinafter. The upper surface of the top portion 52 has a plurality of laterally spaced longitudinally disposed ridges 62 which are adapted to receive and support the underside of the perimeter of the panel 22. When the panel 22 is in the closed position illustrated in FIG. 3 and as will be described hereinafter, the tubular section 46 is compressed; however, due to the longitudinal space 60 the constant expansion and compression of the tubular section 46 does not exert any forces onto the flange portion 56 and thus assures that the flange portion 56 will not prematurely separate from the inclined wall 58 of the frame 20. In the preferred embodiment the molding 44 is made of a closed cell neoprene sponge material.

A pair of releasable latching bayonets 62 are attached at two spaced points along the forward edge of the panel 22 at the lower side of the panel as illustrated in FIG. 3.

FIG. 2 illustrates an exploded perspective view of a releasable latching bayonet 62 comprising a bayonet body 64 having a lower body portion 66 which projects at an angle forward and downward from the lower surface of the panel 22. The lower body portion 66 terminates at an enlarged end 68. The enlarged end 68 has its center portion cut away forming a notch 70. A pair of aligned transverse apertures 72 passing through the enlarged end 68 are sized to receive a pressed in spring pin 74. A cam member 76 slidingly fits between the sides of the notch 70. The cam 76 is pivotally supported by the spring pin 74 passing transversely through an aperture 80 passing through the cam 76. The cam 76 when in its first or latched position has an upward extending projection 78 which projects above the enlarged end 68 of the lower body portion 66 of the bayonet. When the cam 76 is in its released or second position the projection 78 faces the bayonet body 64 and is nested within the notch 70. A cam arm 79 is integral with and joins the cam 76 at its lower portion. When the cam 76 is in its first position the cam arm 79 extends along the lower surface of the lower body portion 66 extending a distance beyond the end of the bayonet body 64. The cam arm 79 serves as a means for rotating the cam 76 from its first position where the projection 78 faces upward to its second or released position where the projection 78 is nested within the notch 70. The bayonet body 64 has an upper wall 89 with a circular boss 82 projecting thereabove. A threaded aperture 91 within the boss 82 threadingly receives a threaded fastener 86. A pair of spaced apart apertures 88 near the forward edge 30 of the panel 22 slidingly receive the bosses 82. The threaded fasteners 86 securely hold the bayonet body 64 to the lower lower surface of the panel 22.

Referring again to FIG. 3, a pair of recessed members 90 are fixedly attached to the lower surface of the frame 20 to align with the releasable latching bayonets 62. The recessed members 90 have at their center a recess 92 to nestingly receive the projection 78 of the cam 76 when the cam is in its first or latched position. When the cam is in its first position the cam projection 78 faces upward and squeezes the resilient molding 44 between the panel 22 and the frame 20. The panel 22, the resilient molding 44, and the projection 78 cooperate to form a pivot about the projection 78 allowing the rear edge of the panel 22 to be raised above the frame creating an opening. When the arm 79 is rotated downward the projection 78 of the cam 76 is nested within the notch 70 and the panel 22 can be moved rearward to free the front end of the panel for removal.

Referring now to FIG. 5 wherein there is illustrated the two-part separable fastener for joining the rear edge of the sunroof panel to a section of the frame. An arm assembly 96 is hingingly attached to a hinge 100 by means of a pivot pin 98. A releasable latch assembly 102 has a latch slide 104 which is shown in the latched position. A pivoting link 106 is pivotally attached at one end to the arm assembly 96 and pivotally attached at the other end to the latch assembly 102. The hinge 100 has a pair of spaced apart bosses 108 which have threaded apertures 110 therein. The pair of bosses 108 align with a pair of apertures 112 in the roof panel 22 and a pair of threaded fasteners 114 securely attach the hinge 100 to the panel 22. The latch assembly 102 has a pair of spaced apart threaded apertures 45 in its upper surface which align with a pair of apertures in the frame 42. A pair of threaded fasteners 43 pass through the apertures in the frame 42 to engage the threaded apertures 45 in the latch assembly 102 to securely hold the latch assembly in abuttment with the underside of the frame 42. When the arm assembly 96 is in the lock position as shown in FIG. 5 the two-part separable fastener is in an overcenter condition and the panel 22 squeezes the resilient molding 44 between the lower surface of the panel and the frame canlilevered section 42.

Figure 6:
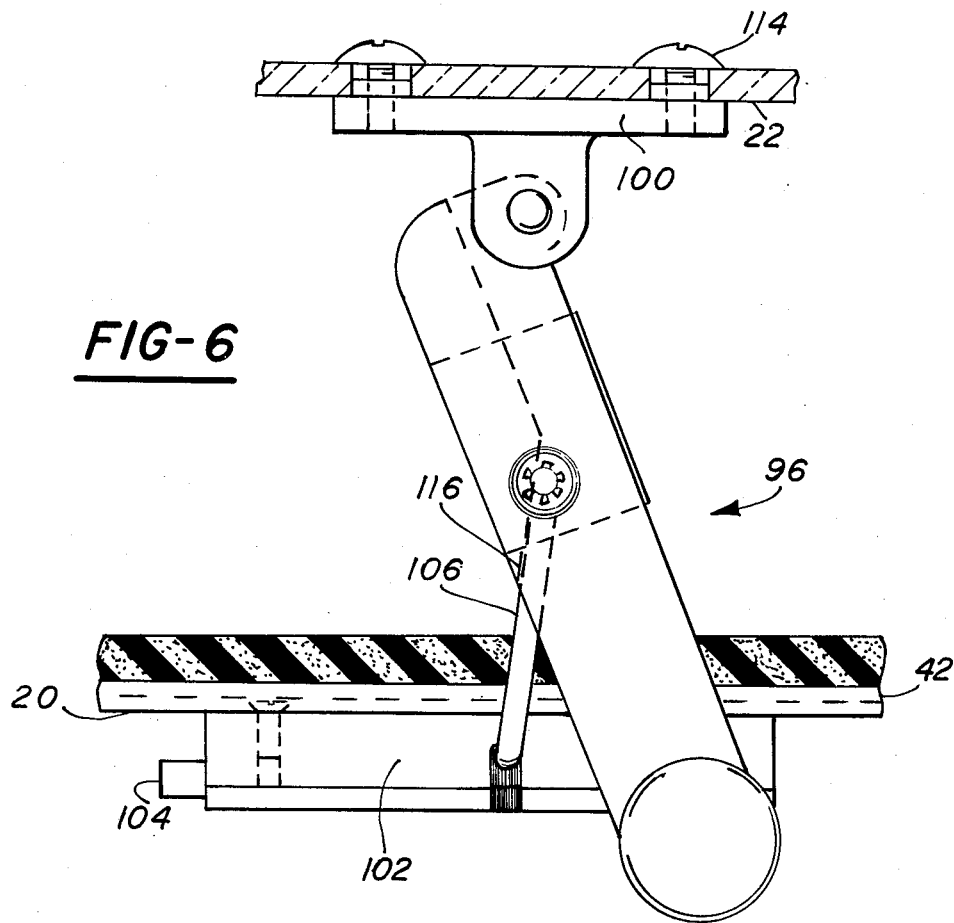
FIG. 6 is a cross sectional view as in FIG. 5 with the arm assembly in the vent position.

FIG. 6 illustrates the two-part separable fastener in the vent position. The arm assembly 96 has been rotated to an approximate vertical position. And the pivoting link with its end pivoting about the arm assembly at one end and the releasable latch at the other end has been pivoted to an approximate vertical position. The arm assembly 96 has been rotated to an overcenter position with the link 106 resting on a projection 116 on the arm to hold the two-part separable fastener in the vent position wherein the panel 22 is spaced above the frame 20 a distance. The latch slide 104 is positioned to the left where it holds the other end of the pivoting link 106 pivotally fastened to the releasable latch assembly 102.

Referring now to FIG. 7 wherein the two-part separable fastener is shown in its released position. To release the rear end of the panel 22 from the frame 20 the latch slide 104 is slid to the right which slides a wall to create an opening in the slot 118 in the releasable latch assembly 102. This allows the other end of the pivoting link 106 to be removed through the slot 118.

To remove the panel 22 from the vehicle opening, the rear edge of the panel is fisrt placed in its vent position as shwon in FIG. 6, then the latch slide 104 is moved to the right to release the other end of the pivoting link 106 through the opening 118. The releasing bayonets 62 at the forward edge of the panel are moved to their released position and the panel is moved rearward a distance and then removed from the vehicle.

Having thus described my invention what I claim is:

1. A releasable latch for joining one edge of a sunroof panel to a section of frame extended about an opening in a vehicle roof comprising:
   a rotatable cam member adjacent the underside of the frame having a first position wherein a cam projection abuts the frame and a second position wherein said projection is retracted;
   a recessed member attached to the frame to nestingly receive said cam projection in its first position;
   means for rotatably supporting the cam to the panel;
   means for rotating the cam from its first position to its second position; and
   means for rotation of the panel about the joined edge.

2. A releasable latch for joining one edge of a sunroof panel to a section of frame as described in claim 1 wherein:
   said means for rotatably supporting the cam comprises;
   a bayonet with one end fixedly attached to the edge of the panel and its other end disposed beneath the recessed member; and
   said other end having a notch at its center to slidingly receive a cam, aligned transverse apertures in the other end and the cam to receive a pin which is snugly received by the other end and rotatably support the cam.

3. A releasable latch for joining one edge of a sunroof panel to a section of frame as described in claim 2 wherein:
   said means for rotating the cam comprises an arm integral with the cam extending rearward along the bottom surface of the bayonet body, projecting past the body a distance, said arm rotatable from a first position abutting the body to a second position perpendicular to the panel.

4. A releasable latch attached to one edge of a sunroof panel for joining the panel to a section of frame as described in claim 2 wherein:
   said means for rotating the panel comprises:
   the releasable latch in its latched position, attached to the panel;
   the recessed member nestingly receiving a cam projection;
   the frame supporting a resilient molding and the recessed member; and
   said cam projection, said frame, said recessed member, said panel and said resilient molding cooperate to allow said panel to be rotated about an edge.

* * * * *

UNITED STATES PATENT AND TRADEMARK OFFICE
CERTIFICATE OF CORRECTION

PATENT NO. : 4,227,738

DATED : October 14, 1980

INVENTOR(S) : Norman L. Sorensen

It is certified that error appears in the above-identified patent and that said Letters Patent are hereby corrected as shown below:

Column 2, line 36, following "reference" the correct spelling of "numberals" should be --numerals--;
Column 3, line 53, following "frame" the correct spelling of "cantilivered" should be --cantilevered--;
Column 3, line 60, following "section" the numeral "44" should be --46--;
Column 4, line 2, following "ridges" the numeral "62" should be --61--;
Column 5, line 20, preceding "with" the correct spelling of "abuttment" should be --abutment--.

Sheet 1 of the drawings should be deleted to insert the attached sheet therefor.

Signed and Sealed this

Sixth Day of January 1981

[SEAL]

Attest:

SIDNEY A. DIAMOND

Attesting Officer

Commissioner of Patents and Trademarks

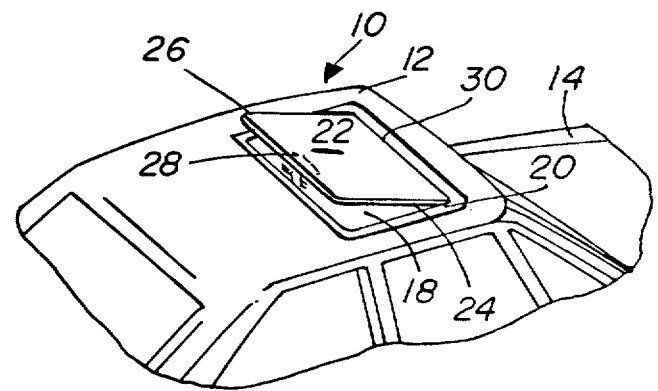
FIG-1
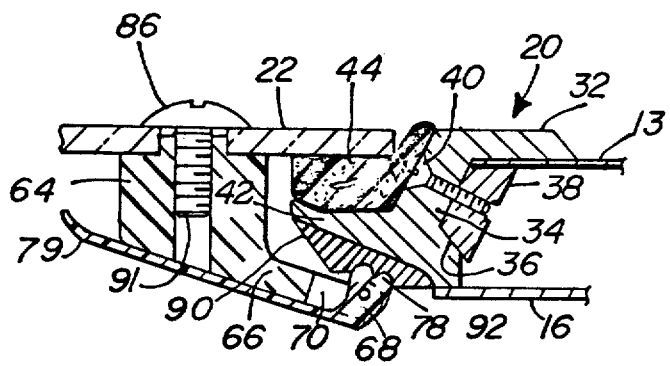
FIG-3
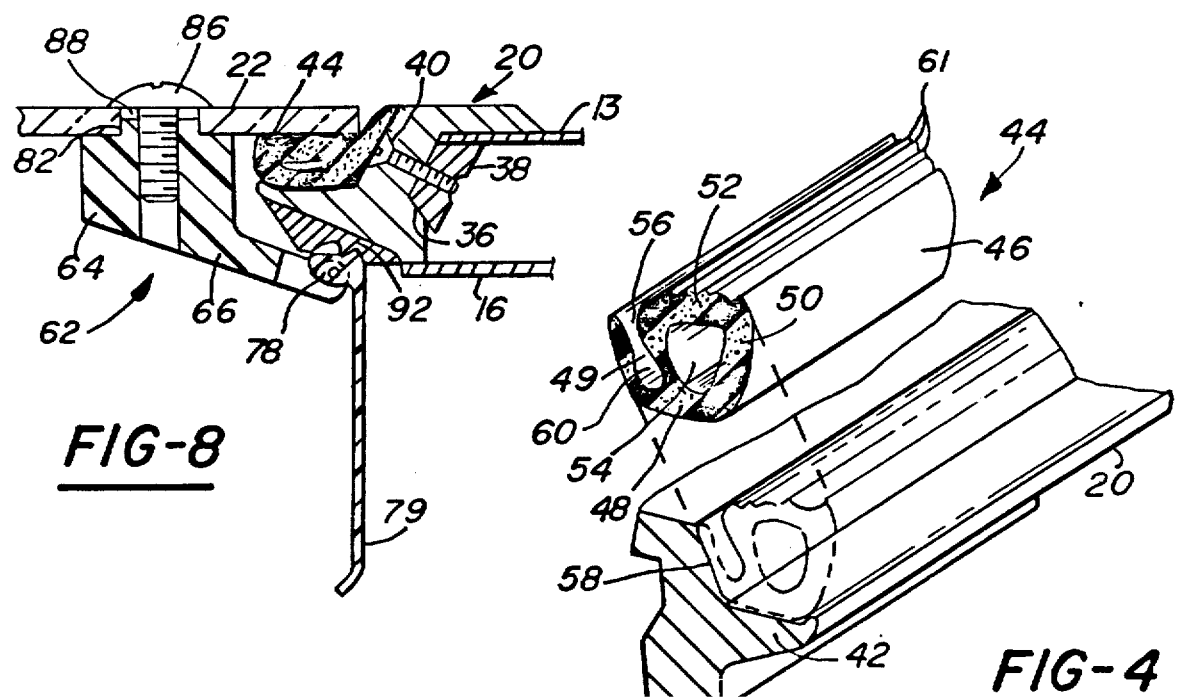
FIG-8
FIG-4